No. 693,269. Patented Feb. 11, 1902.
J. B. HALL.
FISH HOOK.
(Application filed May 9, 1901.)
(No Model.)
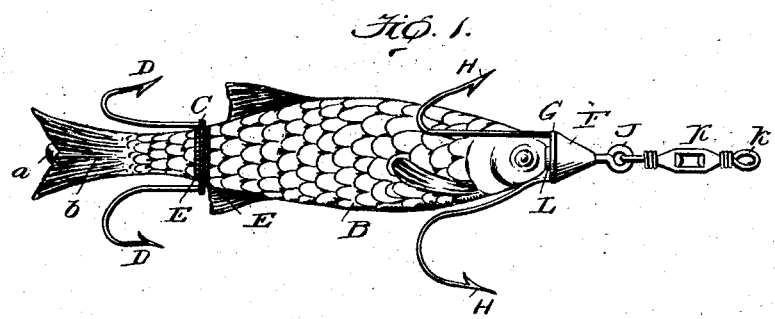
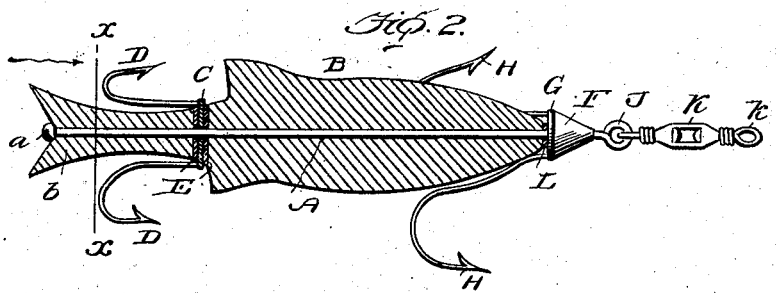
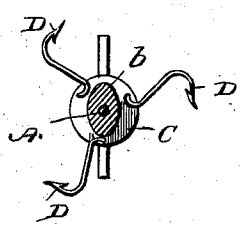
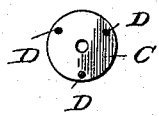 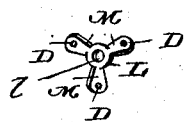
Witnesses
Inventor
James B. Hall
by E. N. Bond
Attorney

UNITED STATES PATENT OFFICE.

JAMES B. HALL, OF CLEVELAND, OHIO.

FISH-HOOK.

SPECIFICATION forming part of Letters Patent No. 693,269, dated February 11, 1902.

Application filed May 9, 1901. Serial No. 59,404. (No model.)

*To all whom it may concern:*

Be it known that I, JAMES B. HALL, a citizen of the United States, residing at Cleveland, in the county of Cuyahoga and State of Ohio, have invented a new and useful Improvement in Fish-Hooks, of which the following is a specification.

This invention relates to fish-hooks, and more particularly to that class of hooks used in trolling. It pertains more especially to that style of hooks in which are employed a lure and a rotatable set of hooks, the object of the present invention being to provide an improved hook of this nature in which the one set of hooks is disposed between the ends of the lure to freely rotate upon the rod or support of the lure, the other set being mounted to rotate at the front end of the lure, the hooks extending backward, so as to be disposed within the confines of the lure, about the forward end of which they rotate. By the present arrangement one, two, three, or more hooks may be employed, the weight always keeping one or more of the hooks under the lure, and as it is always easier to hook a fish in the under jaw the advantage of having a hook or hooks always under the head of the lure will be evident. By my present construction even if the minnow or lure is floating on its back the hooks will always lie under the lure or on either side thereof in position to best hook the fish. It will be noticed that the hooks are all disposed within the length of the lure, thus making the device more compact, and as the hooks rotate automatically as the device is drawn through the water the lure will appear like a live minnow.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side elevation of a trolling-hook made in accordance with my present invention. Fig. 2 is a longitudinal sectional view of the same with a portion in elevation. Fig. 3 is a cross-section on the line $x\ x$ of Fig. 2 looking in the direction of the arrow. Fig. 4 is a view of the plate that carries one set of hooks. Fig. 5 shows another form of hook-carrying device.

Like letters of reference indicate like parts throughout the several views.

Referring now to the details of the drawings by letter, A designates a shaft or rod upon which is secured in any suitable manner, so as to be fast thereto, a lure B, in this instance shown as in the form and representation of a minnow. The lure is divided at a point, say, about two-thirds of the distance from its front end, and between the front or body portion and the tail portion $b$ is mounted for free rotation a plate or disk C, the said disk being loose upon the rod or shaft, and projecting rearward therefrom are one or more hooks D, as seen in Figs. 1, 2, and 3. These hooks are of any suitable form, with their points or barbs provided with a lateral twist or bend, as is common, and the rear ends of the hooks terminate within the limits of the tail portion, as shown. By preference the rear end of the rod or shaft is provided with an enlargement or head $a$, as seen in Figs. 1 and 2, although this is not necessary, as any other suitable means may be employed for preventing endwise displacement of the lure on the rod. Preferably there are provided thin washers E between the two portions of the lure and between which the disk or plate C works, the said washers being either fast to the shaft or to the ends of the lure portions or rotatable on the shaft, as may be found most expedient.

Fast to the forward end of the rod or shaft A is a cone-shaped device F, between the rear face of which and the forward end of the lure there is mounted to rotate freely on the rod or shaft a disk or plate G, carrying one or more hooks H, which extend rearward under the lure, as shown, a washer I being provided, if necessary, between the said disk or plate and the front end of the lure, as seen in Figs. 1 and 2.

The hooks H extend rearward, and their shanks are curved or bent so that they may freely rotate around the front end of the lure, and their points are by preference twisted or bent in a direction opposite to those of the rear hooks, so as to rotate in the opposite direction as the device is drawn through the water.

The extreme front end of the rod or shaft A is provided with an eye or equivalent provision J, as seen in Figs. 1 and 2, and with this eye is engaged a swivel K or turnbuckle of known construction, to the loop $k$ of which the line is designed to be attached.

The hooks may be carried by any suitable form of plate or disk, care being taken to so shape the same as to offer as little resistance as possible to the passage of the device through the water. In Fig. 5 I have illustrated a simple form (designated by the reference-letter L) having the axial opening $l$ for the reception of the rod or shaft A, the arms or wings M being shaped and bent somewhat like a propeller-blade that is turned at an angle, so as to deflect the water, and to the outer ends of these arms the hooks are secured.

Modifications in detail may be resorted to without departing from the spirit of the invention or sacrificing any of its advantages.

What is claimed as new is—

1. In a fish-hook, a shaft, a lure fixedly mounted thereon, and a hook rotatably mounted on said shaft between the front and rear ends of the lure all of said hooks being disposed within the length of the lure, as set forth.

2. In a fish-hook, a shaft, a lure fixedly secured thereto, hooks rotatably mounted at the front of the lure and rearward and disposed in relation to the rear of the forward end thereof, as set forth.

3. In a fish-hook, a shaft, a lure fixedly secured thereto, hooks rotatably mounted on the shaft between the head and tail of the lure, and hooks rotatably mounted on the shaft at the front end of the lure and extended backward and disposed in relation to the rear of the front end of the lure, as set forth.

4. In a fish-hook, a shaft, a lure thereon, and hooks at the front and between the front and rear of the lure, said hooks being all disposed between the front and rear ends of the lure, as set forth.

5. In a fish-hook, a shaft, a lure thereon and divided toward its rear end, a plate rotatable on the shaft between the divided portions of the lure, and hooks carried by said plate and terminating between the front and rear ends of the lure and hooks at the front end and disposed between the front end of the lure and the first-mentioned hooks, as set forth.

JAMES B. HALL.

Witnesses:
W. A. MIDDLEKAMP,
CLEMENTINE FRANKENBEY.